United States Patent
Garber

(10) Patent No.: US 6,602,412 B2
(45) Date of Patent: Aug. 5, 2003

(54) SINGLE CARTRIDGE FILTER HOUSING

(75) Inventor: Robert G. Garber, San Jose, CA (US)

(73) Assignee: InFlos Designs, Santa Clara, CA (US)

( * ) Notice: Subject to any disclaimer, the term of this patent is extended or adjusted under 35 U.S.C. 154(b) by 0 days.

(21) Appl. No.: 10/087,537

(22) Filed: Mar. 1, 2002

(65) Prior Publication Data

US 2002/0121469 A1 Sep. 5, 2002

Related U.S. Application Data

(60) Provisional application No. 60/272,794, filed on Mar. 1, 2003.

(51) Int. Cl.[7] .......................... B01D 27/08; B01D 35/30
(52) U.S. Cl. ...................... 210/232; 210/443; 210/450
(58) Field of Search ............................... 210/232, 450, 210/443

(56) References Cited

U.S. PATENT DOCUMENTS 3,501,005 A * 3/1970 Russo et al.
5,609,757 A * 3/1997 Schiavo et al.
6,210,577 B1 * 4/2001 Garber

* cited by examiner

Primary Examiner—Thomas M. Lithgow
(74) Attorney, Agent, or Firm—Hans J. Von Der Pfordten

(57) ABSTRACT

A single cartridge filter housing assembly for the filtration of etching liquids, deionized water, slurries and other liquids used in the semiconductor, pharmaceutical and chemical industries. It comprises a bottom housing and a top housing with an O-ring in between and a nut ring engaging top and bottom housings in order to compress the O-ring thus forming a sealed cavity for the cartridge. The bottom housing holds the nose of the cartridge in a concentric recess and holds the cartridge top centered by several radial protrusions in its mouth. An inlet and an outlet at the bottom of the bottom housing for the liquid to be filtered are coaxial for easy plumbing connections. The top housing carries a vent tube to use the air within to stabilize the liquid level in spite of pressure variations because of pump action.

10 Claims, 7 Drawing Sheets

SINGLE CARTRIDGE FILTER HOUSING

This application is based on provisional application No. 60/272,794 filed on Mar. 1, 2003.

BACKGROUND

1. Field of the Invention

The present invention relates to the field of high-purity filtration, especially high-temperature filtration in chemical, pharmaceutical and semiconductor industries where high reliability, easy maintenance, like a cartridge change, and performance like extremely low particle count are of prime importance.

2. Description of the Prior Art

Presently available filter housing assemblies use cartridges inserted into a cylindrical housing with a twist-top for tightening an O-ring against the housing in order to generate a sealed cavity for the cartridge, with an inlet and an outlet for the liquid to be filtered. The commercial filter cartridge is closed off at the top and the liquid enters the filter material under pressure to flow radially to a central tube-like space, then axially towards the exit duct at the bottom and the outlet. Usually the cartridge is held only by its two O-rings at its nose end in the bottom recess of the housing without a concentric hold at its top, possibly leading to a tilt and to leaks around the O-rings which in turn leads to uneven filtration and shortened cartridge lifetime. Together with the used cartridge filter housings are often thrown away amounting to economical and environmental waste. Often little attention had been paid to an easy installation of the filter housing and an economical replacement of filter cartridges for minimal process interruption.

SUMMARY OF THE INVENTION

It is an objective of the present invention to provide a filter housing for one cartridge with centering on its top to prevent tilting of the cartridge, thus preventing unreliable filtering. The housing can be made out of plastic materials like TEFLON® PVDF or of Polupropylen for liquid temperatures of about 190 centigrades (375 degrees F.) or of about 90 centigrades (194 degrees F.), respectively at pressures as high as 5 bars (70 psi). The housing assembly comprises a bottom and a top housing and a nut ring for fastening the housings together with an O-ring to form a sealed cavity for the cartridge, except for the inlet and the outlet. This O-ring between the housings and two O-rings around the nose of the cartridge, which seal against the pressure drop across the cartridge, are the only seals required. The air pocket in the cavity of the top housing provides a cushion against liquid level variations and thus pressure variations caused by pump action. The top housing is penetrated by a fixed vertical vent channel for stabilizing the liquid level if it drops below the lower vent channel opening. The bottom of the bottom housing carry cutouts to allow easy fastening on a wet bench with protruding bolts. Inlet and outlet are coaxial to facilitate plumbing connections. A filter cartridge change can easily be accomplished by unscrewing the nut ring, removing the top housing, pulling out the cartridge, inserting another cartridge, putting on the top housing and tightening the O-ring between the top and the bottom housing by tightening the nut ring.

An advantage of the present invention is that the sealing interfaces are joined together by a sliding action, cradling the O-ring and avoiding twisting and abrasive action on it.

Another advantage of the present invention is an easy change of the filter cartridge involving only one O-ring to be tightened by screwing a nut ring around top housing onto bottom without twisting the O-ring.

IN THE DRAWINGS

DESCRIPTION OF THE PREFERRED EMBODIMENT

Figure 1:
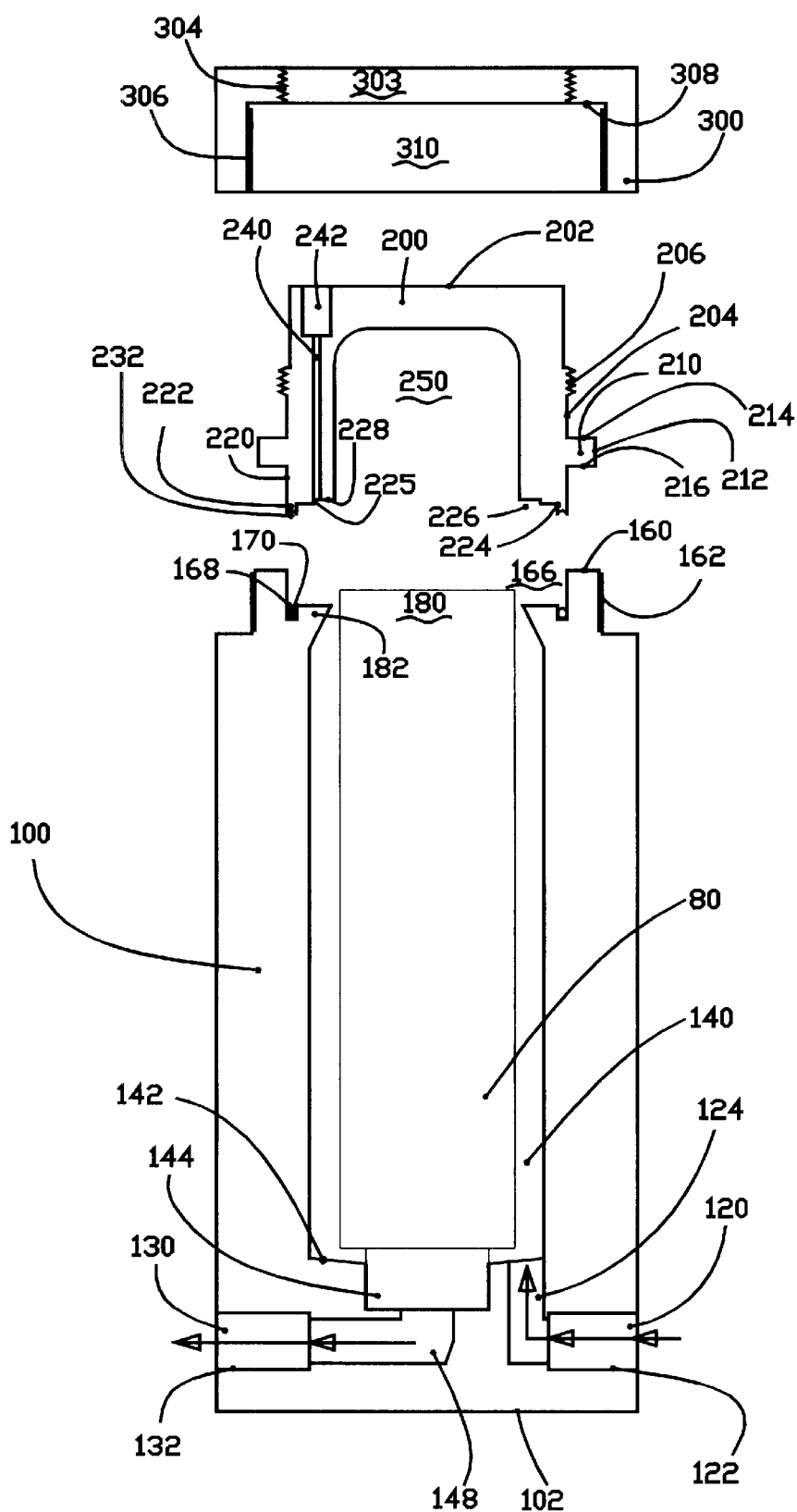
FIG. 1 depicts the housing assembly
Figure 2:
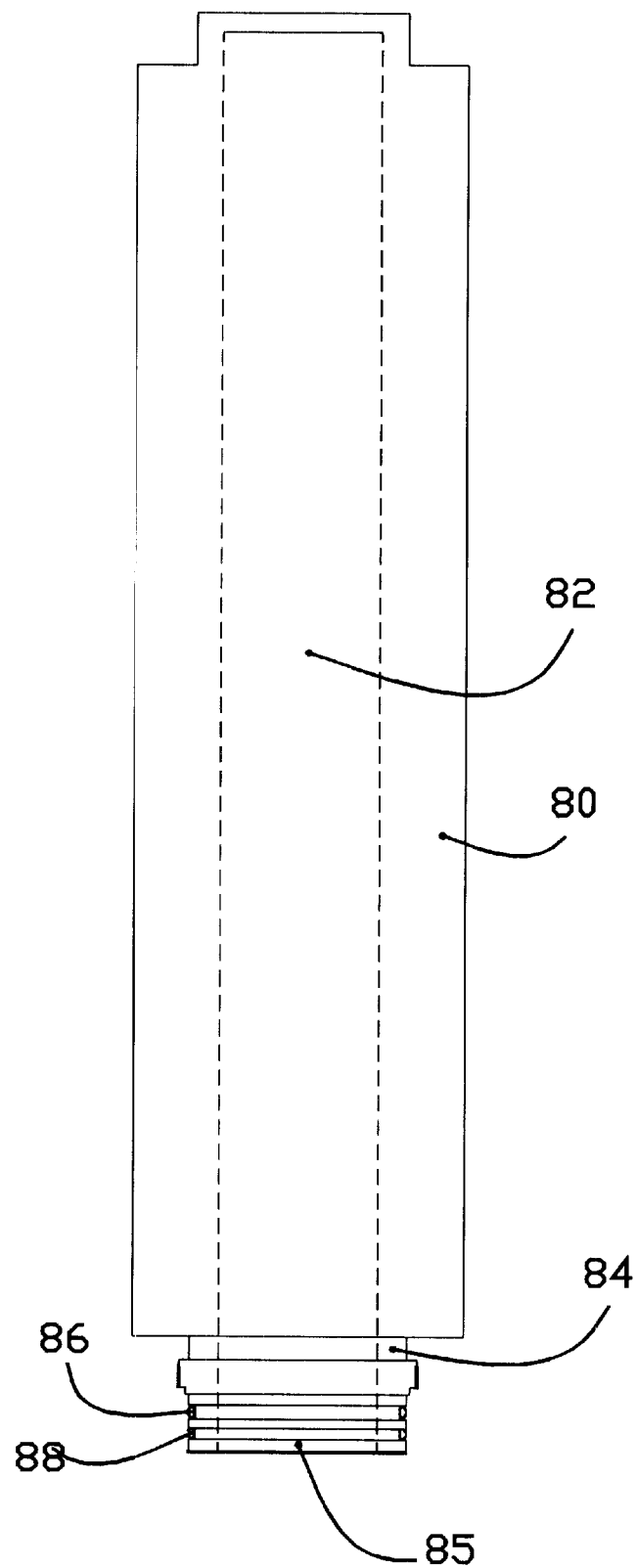
FIG. 2 shows a commercial filter cartridge
Figure 3:
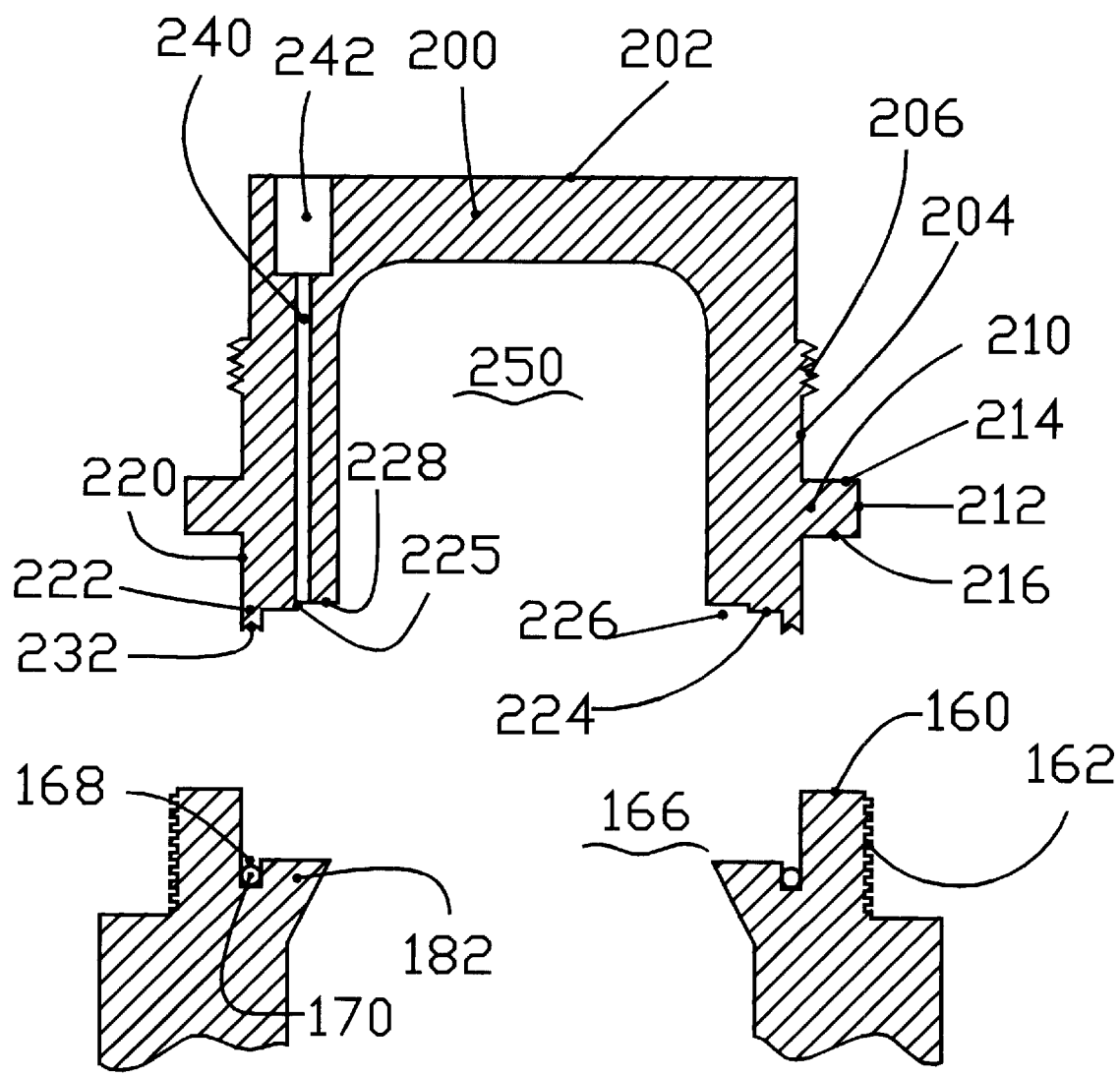
FIG. 3 illustrates the protrusions centering the top of the cartridge
Figure 4:
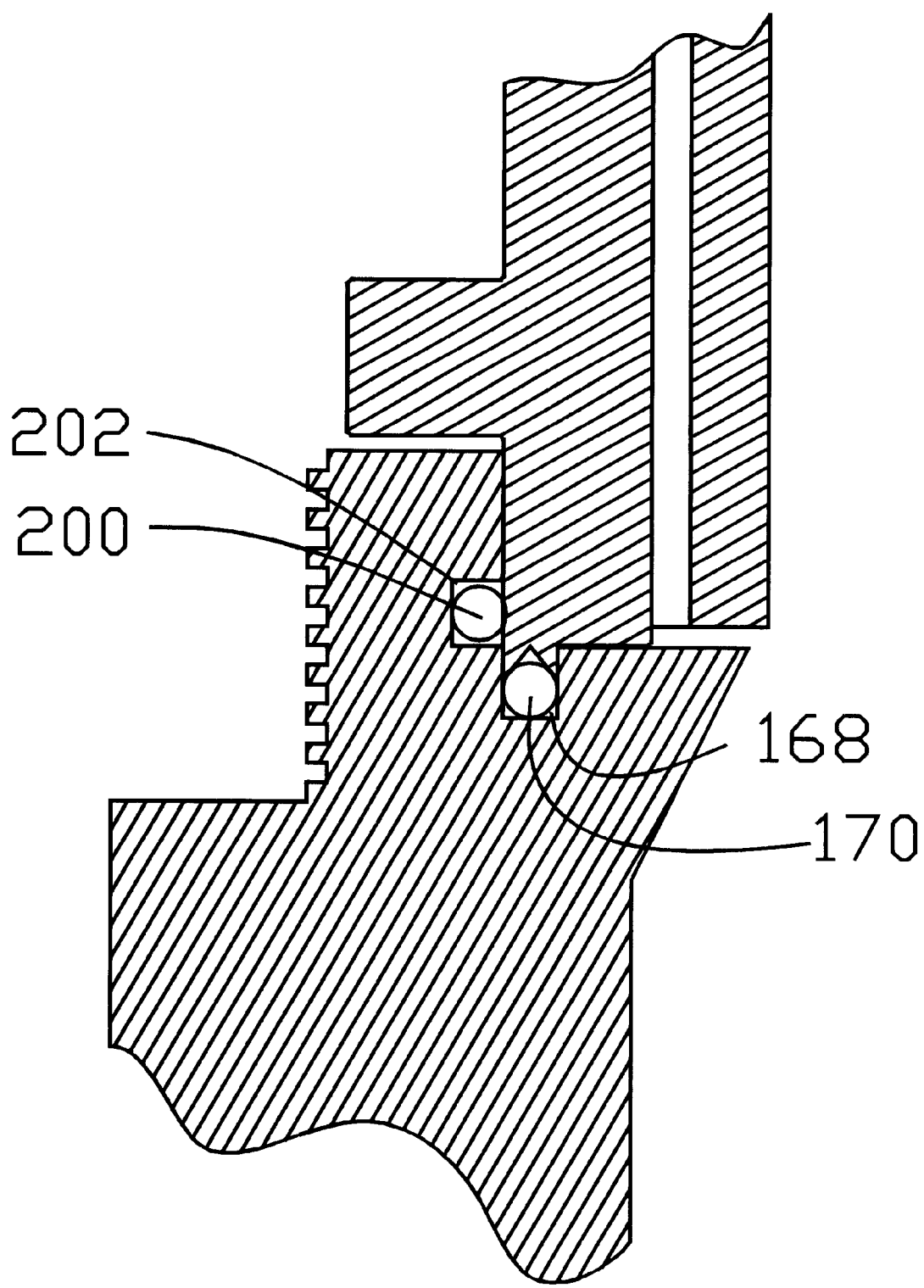
FIG. 4 shows a cross-section of the assembled housing
Figure 6:
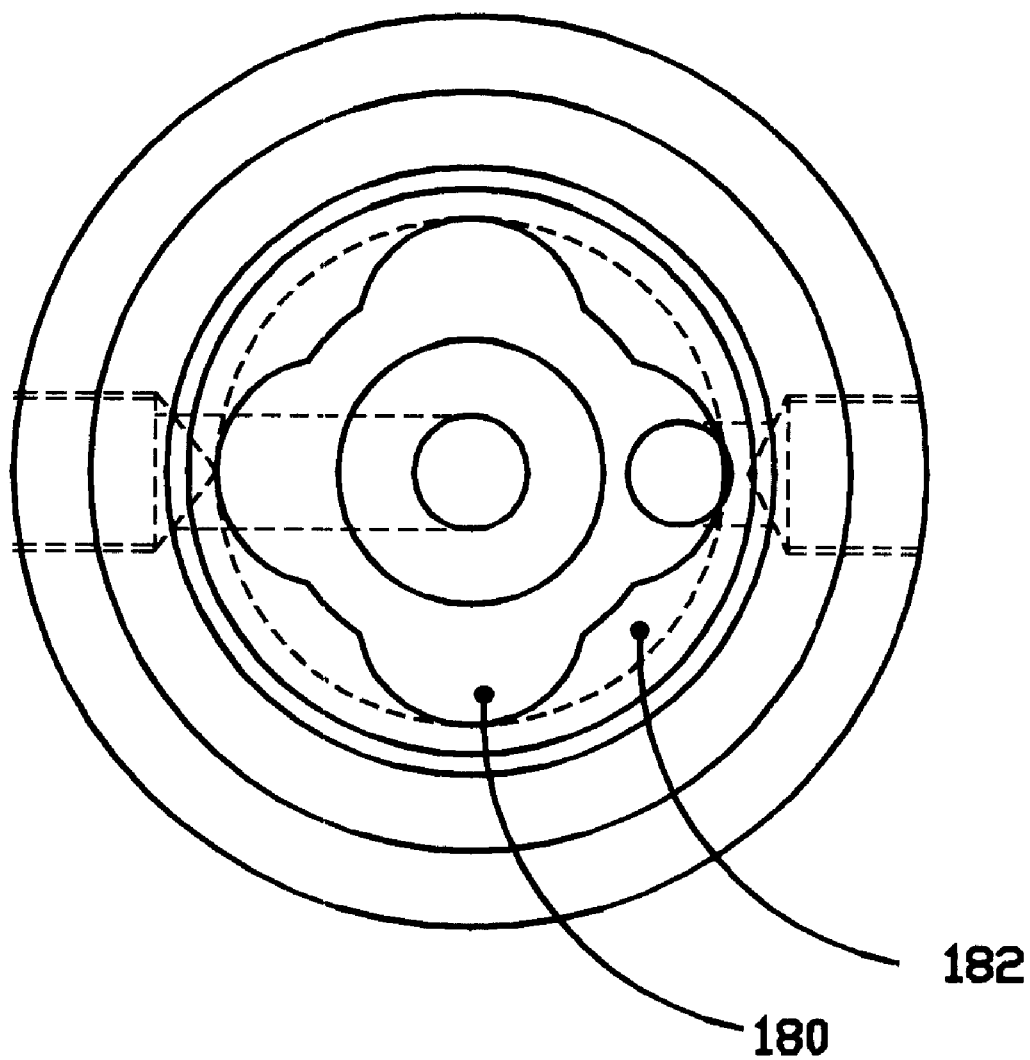
FIG. 6 shows a top view of the housing
Figure 7:
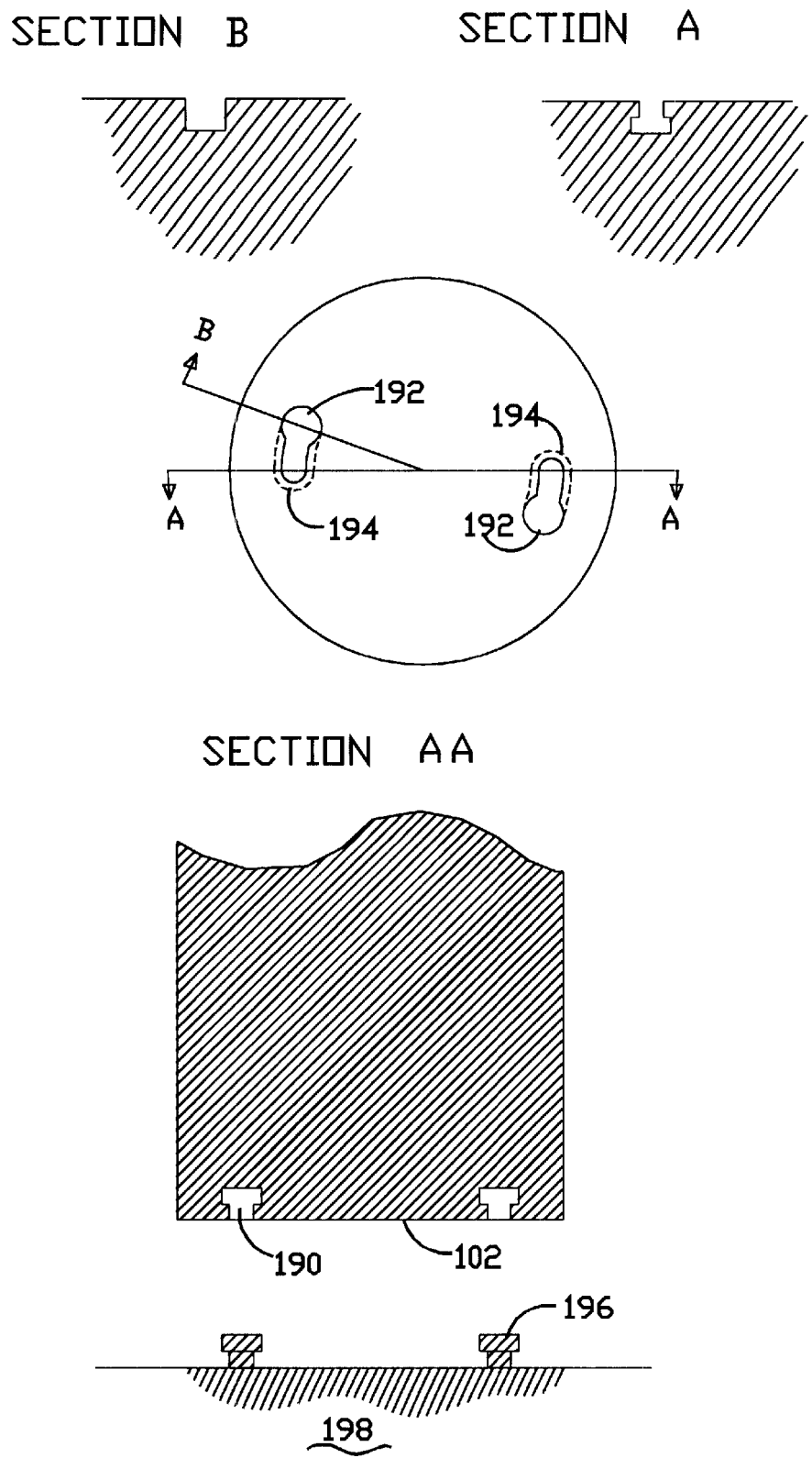
FIG. 7 shows the fastening of the housing to a platform

The present invention relates to a single cartridge filter housing assembly for the high-purity filtration of etching liquids, deionized water, slurries and other liquids used in the semiconductor, pharmaceutical and chemical industries at elevated temperatures of up to 180 centigrades. One objective of the invention is easy installation with easy plumbing connections e.g. on a wet bench and easy filter cartridge change to minimize process downtime and cost of ownership. The filter housing assembly is depicted in FIG. 1 as housing assembly 10 made out of a suitable corrosion-resistant plastic like Polytetrafluoroethylene (PTFE or TEFLON®, for higher temperature liquid) or Polypropylene (for moderate temperature liquid) and comprises an elongated cup-shaped bottom housing 100 with an inlet and an outlet for the liquid, a cup-shaped top housing 200, serving as the lid for housing 100, a nut ring 300 for fastening bottom and top housing together and a commercially available filter cartridge 80. All structures, components, recesses, flanges etc. of assembly 10 are symmetrical, concentric and coaxial except the inlet and outlet structures and the fixed vent channel. Throughout this description and the claims the expression "cup" is used for a cup-shaped cavity covering one half or more of a cartridge, and "cap" is used for a cup-shaped cavity with less than half or no coverage of a filter cartridge. Housing assembly 10 also comprises means for holding the assembly together, sealing it and centering the cartridge within and for connecting the assembly to an inlet and an outlet of the liquid to be filtered. FIG. 2 shows a commercially available cylindrical filter cartridge 80 which is closed at the top and encompasses a tube shaped filter, through which the liquid is forced under pressure in an inwardly radial direction into its inner cavity 82 with a nose 85 at its lower end, through which the filtered liquid exits. Nose 85, separated from the cartridge by a neck 84, customarily has two parallel O-rings 86 and 88 attached around its cylindrical face for sealing against the pressure drop across the cartridge. Housing 100 has a cup shape for receiving and holding cartridge 80 in its cavity 140 and a flat outer bottom surface 102 to stand on. As seen in FIG. 1 at its lower portion housing 100 carries a radially oriented inlet bore 120 with thread 122, for connection to a threaded inlet hose. A small axial bore 124 provides a flow path for the liquid to be filtered from inlet 120 to the cavity 140 and to the outer cylindrical surface of cartridge 80, from where it progresses under pressure radially towards cylindrical inner filter cavity 82 of cartridge 80. At its bottom housing cavity 140 carries a downwardly pointing conical annular surface 142 with an opening angle of less than 180 degrees (about 170 degrees in this embodiment) for self-draining of the liquid, connecting the larger diameter cavity 140 to the smaller diameter recess 144. Recess 144 is shaped cylindrically to receive the nose of cartridge 80 with its two O-rings 86 and 88. A smaller diameter bore 148 connects recess 144 to outlet bore 130 to provide a flow path for the filtered liquid from inner cartridge cavity 82 via recess 144 and bore 148 to outlet 130. Radially oriented outlet bore 130 is located opposite inlet 120 and like it carries a thread 132 for receiving a threaded outlet hose. Inlet 120 and outlet 130 are coaxial with each other, thus facilitating in-line mounting on a wet bench baseboard. As shown in FIG. 3 at the top end of the bottom housing cavity 140 its mouth ends in an axial flange 160 with an outside thread 162 and an inside recess 166 down to opening 180 for receiving cartridge 80. Opening 180 has four radial protrusions 182 arranged in the form of a cross as indicated in FIG. 6 for holding cartridge 80 concentric at its upper end while allowing liquid to flow axially between the protrusions 182 into the space above the cartridge 80. The inner surface of recess 166 is cylindrical and at its outer periphery carries a radial groove 187 above the level of opening 180 holds O-ring 188. An axial groove 168 extends below the level of recess 166 for receiving an O-ring 170. As shown in FIG. 3 cap-shaped cylindrical top housing 200 forms a cavity 250 and comprises a top surface 202, a midsection 204 carrying a larger diameter thread 206 near top surface 202, a radial flange 210 with an outer cylindrical surface 212 and with an upper annular surface 214 and a lower annular surface 216. At its lower end top housing 200 has a cylindrical axial flange 220 with a lip 222 delineating a large diameter recess 224, axially separated by a small vertical step 225 from a smaller diameter deeper recess 226 with annular surface 228 as seen in FIG. 3. Lip 222 ends downward vertically in at least one half section of a V-groove 232 for engaging O-ring 170. Top housing 200 also carries a small diameter fixed vent channel 240 between annular surface 228 and top surface 202 with an enlarged threaded bore 242 near top surface 202. Nut ring 300 fastens and seals top housing 200 to bottom housing 100. It carries a large coaxial bore 310, with an inside thread 306 for engaging thread 162, and a smaller bore 303, with an inside axial thread 304 for engaging outside thread 206 forming a left-handed thread pair, that is a counter-clockwise turn of nut ring 300 effects an axially downward relative movement. Bores 310 and 303 delineate an inner annular surface 308. FIG. 4 shows the assembled filter housing assembly. When top housing 200 is placed over the bottom housing 100 containing a filter cartridge, flange 220 is inserted into recess 166 and flange surface 216 is in contact with lip 160. Lip 222 extends into groove 168 and O-ring 170 is pushed into groove 168 by V-groove 232. O-ring 189 seals flange 220 against lip 160. Then nut ring 300 is placed over top housing 200 with inside thread 304-engaging outside thread 206 counter-clockwise and after their downward disengagement, inside thread 306 is clockwise engaging outside thread 162, which results in pressing surface 308 against surface 214 and sealingly compressing O-ring 170. This action spreads at least the inside one of the deformable plastic wedge tips of V-groove 232 against the walls of groove 168 and prevents the liquid from making contact with O-ring 170, thus prolonging its useful life. Keeping nut ring 300 attached to top housing 200 by keeping the thread 304 below thread 206 prevents nut ring 300 from getting disengaged from top housing 200 and from getting misplaced during filter changing. Thread 306 engaging thread 162 are in an opposite direction to that of thread 304 engaging thread 206. For example, the turning direction of nut ring 300 for disengaging top housing 200 relatively axially upward from bottom housing 100 is clockwise for threads 304 and 206 and counter-clockwise for threads 306 and 162. By turning nut ring 300 in a counter-clockwise causing first nut ring thread 304 to ratchet along top housing thread 206 without engaging it while disengaging thread 306 from thread 162, this arrangement allows to pull top housing 200 gently out of housing 100 in a radially balanced way.

Figure 5:
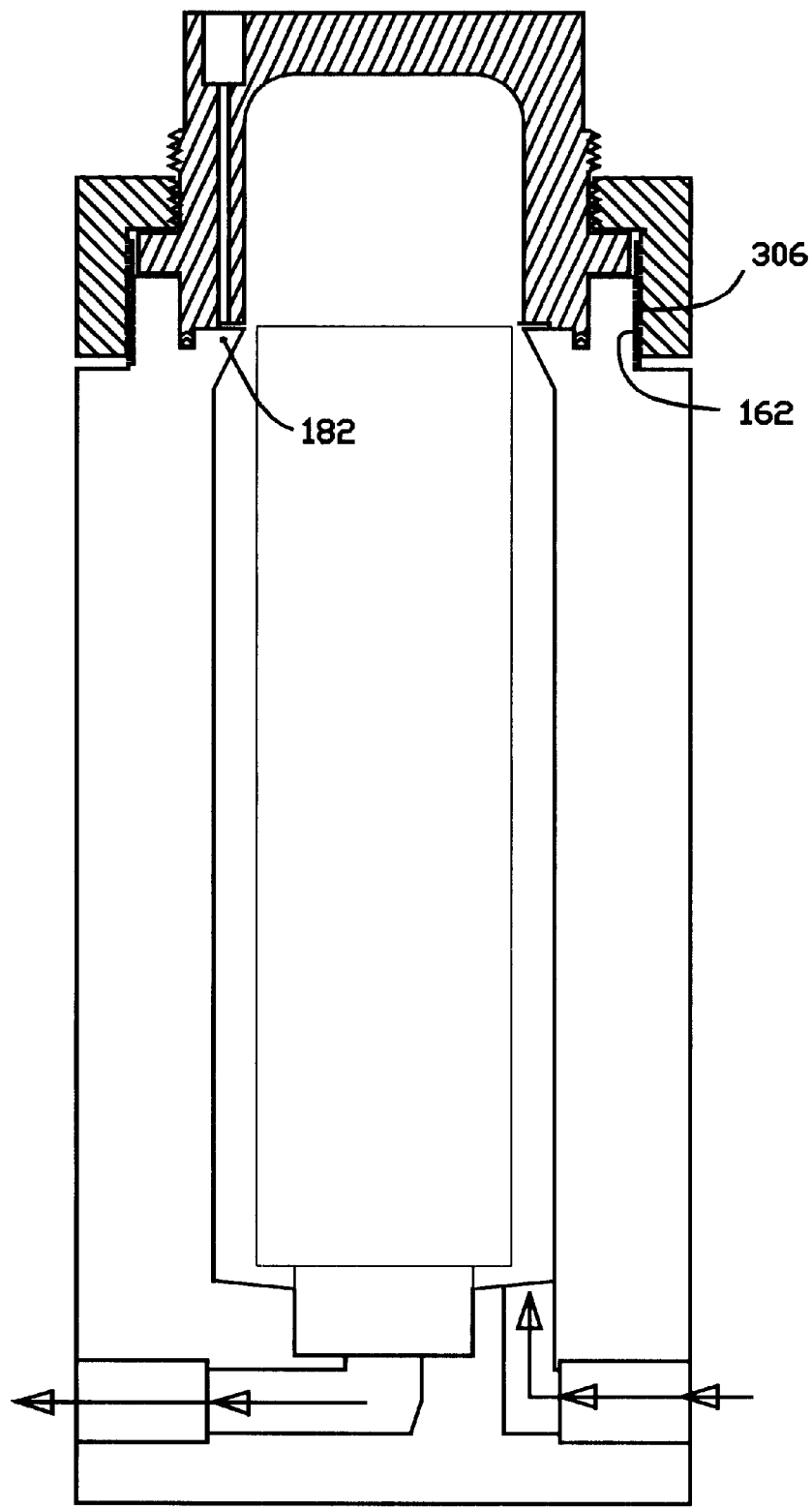
FIG. 5 shows the housing assembly fastened together

The liquid to be filtered extends above housing 100 via space 180 between radial protrusions 182 into cavity 250 where a compressed air space is formed. Pressure fluctuations in the liquid to be filtered are buffered by this air space in cavity 250 to create a dampened air pressure drop across the medium of filter 80. Vent channel 240 helps to stabilize the liquid level above filter 80 since air vents much faster than liquid and venting occurs when the liquid level drops below the level of annular surface 228 thus bringing the liquid level above the level of recess 226 again. Step 225 provides a disk-like air space connecting cavity 250 with vent channel 240 for venting while preventing its clogging. For this purpose the diameter of vent channel 240 has to be larger than step 225. The loss of a small amount of liquid via vent channel 240 into a liquid reservoir (not shown) is acceptable. As seen in FIG. 5 bottom surface 102 has two hollow cutouts 190, symmetrically opposite and equidistant from the center axis. Both carry a symmetrically opposite cylindrical cutout 192 tangentially merging into symmetrically opposite T-shaped cutouts 194. Their purpose is to be engaged by two symmetrically opposed screws 196 with T-shaped bolt heads located on a wet-bench baseboard 198 such that cutouts 192 of the assembled filter housing can be placed over screw heads 196. A rotational twist then moves screw heads 196 into cutouts 194, thus locking housing assembly firmly in place on baseboard 198 of a wet bench.

Although the present invention has been described in terms of the presently preferred embodiment, it is to be understood that such disclosure is not to be construed as limiting. Various alterations and modifications will no doubt become apparent to those skilled in the art after having read the above disclosure. Thus, it is intended that the appended claims be interpreted as covering all alterations and modifications as fall within the true spirit and scope of the invention.

What is claimed is:

1. A housing assembly (10) for the filtration of a liquid, for holding a commercial replaceable filter cartridge (80) with a closed top and an open end bottom nose (85) carrying two O-rings (86,88), the housing assembly comprising:

a) a cup-shaped bottom housing (100), with a flat bottom outer surface (102) and with a cylindrical outer surface having at its top a smaller diameter lip (160) with an outside thread (162) surrounding a smaller diameter cylindrical first recess (166) with a downwardly extending first groove (168) for holding an O-ring (170), the recess having a concentric upward opening (180) of a cavity (140) for holding the cartridge (80), the cavity (140) at its lower end having a smaller diameter cylindrical second recess (144) for sealingly receiving the O-rings (86,88) of the nose of cartridge (80), the cavity (140) also having an axial duct through the second recess (144) for connecting perpendicularly to a radial inlet (120) and the second recess (144) having a concentric duct (148) leading perpendicularly to a radial outlet (130);

b) a cap-shaped cylindrical top housing (200) having a downwardly open cavity (250) and having a larger diameter radial flange (210) with an upper annular surface (214) and a lower annular surface (216) and having an cylindrical lower axial flange (220) with a lip (222) having a second groove (232) for engaging the first recess (166) of the bottom housing (100) with the O-ring (168) in the first groove (170), the axial flange (220) having a larger diameter recess (224) and a smaller diameter deeper recess (228), the top housing (200) also carrying an outside thread (206) between its top and the radial flange (210);

c) a cylindrical nut ring (300) having an axial cylindrical flange with an inside first thread (306), for engaging the outside thread (162) of the bottom housing, and a smaller diameter top opening (303), creating an inside annular surface (308), with an inside second thread (304) for engaging the outside thread ((206) on the top housing (200), for the annular surface (308) engaging the upper annular surface (214) of the radial flange (210) of the top housing (200); wherein the bottom housing and the top housing via the common interface form a closed sealed cavity around the cartridge (80), such that the liquid to be filtered enters the inlet (120) in the bottom housing (100), flows radially through the cylindrical portion (82) of the cartridge (80) and through its nose (85) to the outlet (130) of the bottom housing (100).

2. The housing assembly of claim 1, wherein
the cavity (140) and the second recess (144) delineate an annular surface (142) of a downwardly conical shape at a small angle respective a horizontal line to support drainage to the duct (148).

3. The housing assembly of claim 1, wherein
the top housing (200) carries an outside thread (206) between its top surface (202) and its flange (210) and the opening (303) of nut ring (300) carries an inside thread (304) for engaging the outside thread ((206) on the top housing (200) thread for the nut ring to be loosely connected to the top housing (200) to prevent loss or misplacement of the nut ring due to disengagement from the top housing (200) when changing cartridges.

4. The housing assembly of claim 1, wherein
the opening (180) of the cavity (140) has a plurality of inwardly pointing protrusions (182) to center the top of the cartridge (80) while spaces (180) between the protrusions provide channels for liquid communications for fluid level changes due to pump action to be dampened by the airspace in the cavity (250) of the top housing (200).

5. The housing assembly of claim 1, wherein
a vent channel (240, 242) extends through the top housing down to the smaller diameter recess (228) for setting a lowest liquid level above the top of the cartridge (80), thus providing a compressible air pocket in the cavity (250) in the housing assembly for dampening pressure variations of the liquid due to pump action.

6. The housing assembly of claim 1, wherein
the inlet (120) and the outlet (130) are coaxial for easy pipe connections on a wet bench.

7. The housing assembly of claim 5, wherein
there is a step (225) between the larger diameter annular ring (224) and the smaller annular ring (226) and the step (225) is considerably smaller than the diameter of the vent channel (240) for helping to prevent polluting particles in the unfiltered liquid from entering and clogging the vent channel (240).

8. The housing assembly (10) of claim 1, wherein
the turning direction of the nut ring (300) for disengaging the top housing (200) from the bottom housing (100) in an axial upward direction by disengaging the first thread (306) of the nut ring (300) from the bottom housing thread (162) is in an opposite sense from that of the second thread (304) of the nut ring (300) mating with the top housing thread (206) such that a radially balanced upward axial disengagement of the top housing (200) relative to the bottom housing (100) is effected while the second thread (304) of the nut ring (300) is ratcheting on the top housing thread (206) without engaging it.

9. The housing assembly (10) of claim 1 wherein
the O-ring 170 is sealingly compressed by V-groove 232 having deformable edges spreading at the deformeable edges of V-groove 232, thereby preventing the liquid from making contact with the O-ring 170, thus prolonging its useful life.

10. The housing assembly of claim 1, wherein
the bottom outer surface (102) carries two symmentrically opposed cylindrical recesses (192) equidistant from the center axis, tangentially merging into T-profiled cutouts to be engaged by bolt heads of fasteners fastened to a platform like a wet bench and to be fixed thereon by a rotational twist of the housing assembly (10).

* * * * *